(12) United States Patent
Chen et al.

(10) Patent No.: US 8,969,787 B2
(45) Date of Patent: Mar. 3, 2015

(54) OPTICAL DETECTING APPARATUS FOR COMPUTING LOCATION INFORMATION OF AN OBJECT ACCORDING TO THE GENERATED OBJECT IMAGE DATA WITH A SIDE LIGHT SOURCE FOR MINIMIZING HEIGHT

(71) Applicant: PixArt Imaging Inc., Hsin-Chu (TW)

(72) Inventors: Hsin-Chia Chen, Hsin-Chu (TW);
Shu-Sian Yang, Hsin-Chu (TW);
Yi-Fang Lee, Hsin-Chu (TW);
Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 199 days.

(21) Appl. No.: 13/709,079

(22) Filed: Dec. 10, 2012

(65) Prior Publication Data

US 2013/0320191 A1    Dec. 5, 2013

(30) Foreign Application Priority Data

Jun. 1, 2012   (TW) .............................. 101119769 A (51) Int. Cl.
*H01J 40/14*   (2006.01)
*G01J 1/04*    (2006.01)
*G06F 3/042*   (2006.01)

(52) U.S. Cl.
CPC ................. *G01J 1/04* (2013.01); *G06F 3/0421* (2013.01); *G06F 3/0425* (2013.01)
USPC .......................................... 250/221; 250/239

(58) Field of Classification Search
USPC ................. 250/221, 559.4, 556, 239; 356/73; 345/175
See application file for complete search history.

(56) References Cited

U.S. PATENT DOCUMENTS

2009/0103853 A1 *  4/2009  Daniel ............................. 385/13
2009/0267919 A1 * 10/2009  Chao et al. ..................... 345/175
2012/0224054 A1 *  9/2012  Ogawa ........................... 348/135

* cited by examiner

*Primary Examiner* — Que T Le
(74) *Attorney, Agent, or Firm* — Winston Hsu; Scott Margo

(57) ABSTRACT

An optical detecting apparatus, which comprises: a detecting surface; a first light source, for providing light parallel to the detecting surface; an image sensor, for detecting an object close to the detecting surface, to generate object image data; and an object location determining apparatus, for computing location information of the object according to the object image.

29 Claims, 6 Drawing Sheets

OPTICAL DETECTING APPARATUS FOR COMPUTING LOCATION INFORMATION OF AN OBJECT ACCORDING TO THE GENERATED OBJECT IMAGE DATA WITH A SIDE LIGHT SOURCE FOR MINIMIZING HEIGHT

BACKGROUND OF THE INVENTION

1. Field of the Invention

The present invention relates to an optical detecting apparatus, and particularly relates to an optical detecting apparatus utilizing a flank light source.

2. Description of the Prior Art

A conventional optical detecting apparatus, such as an optical touch panel, utilizes a light source to illuminate an object such as a finger on a detecting surface in a bottom to up direction, to acquire location information of the object.

Figure 1:
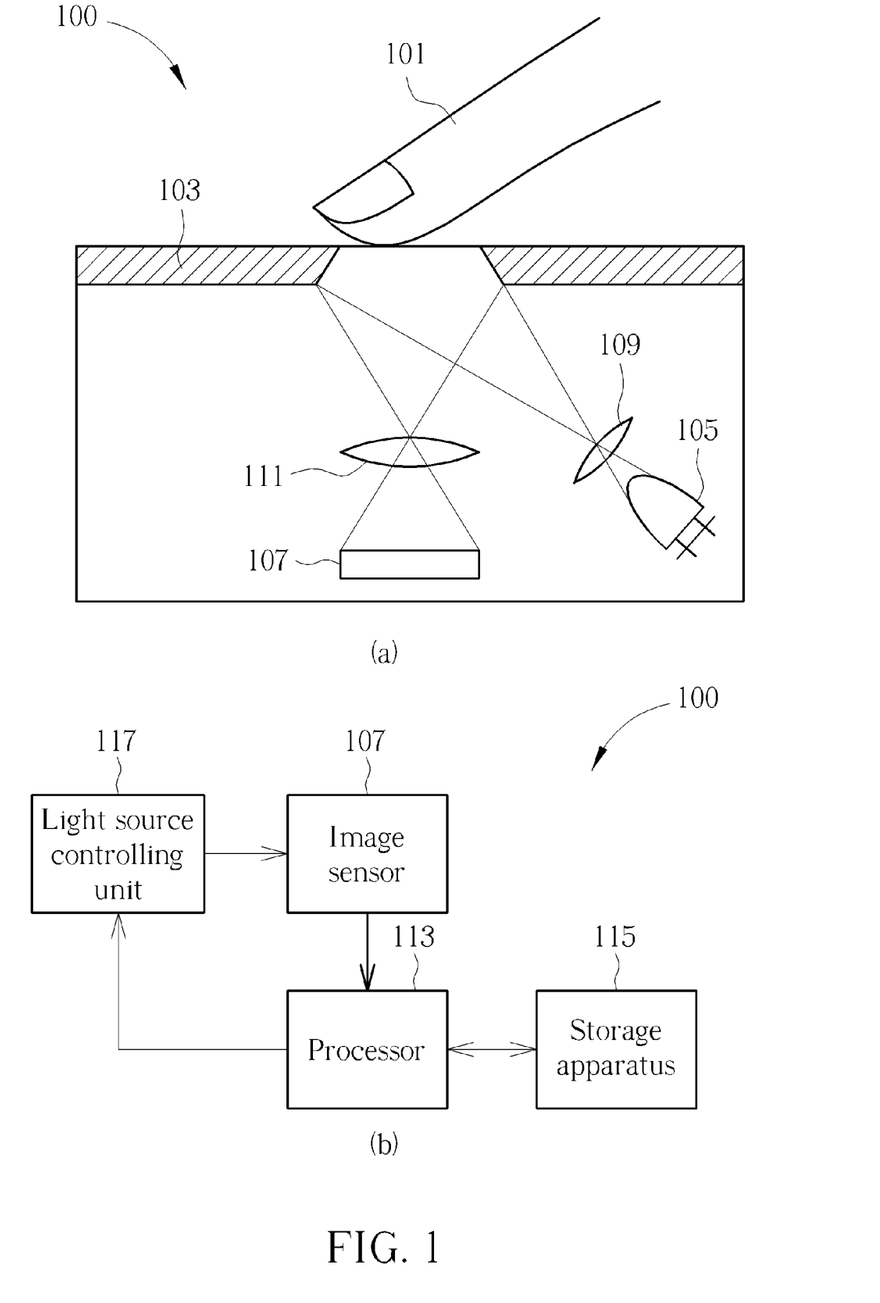
FIG. 1 are schematic diagrams illustrating a conventional optical detecting apparatus.

FIG. 1 are schematic diagrams illustrating a conventional optical detecting apparatus 100. FIG. 1(a) is a cross-sectional view of the conventional optical detecting apparatus 100, and FIG. 1(b) is a circuit block diagram illustrating a circuit inside the optical detecting apparatus 100, which can control the operation of the optical detecting apparatus 100. The optical detecting apparatus 100 includes a detecting surface 103, a light source 105, an image sensor 107, lens 109, 111, a processor 113, a storage apparatus 115 and a light source controlling unit 117. The light source 105 is controlled by the light source control unit 117 to illuminate the finger 101 on the detecting surface 103 to generate an image. The image sensor 107 captures frames in the image. The processor 113 computes location information of the finger 101 according to captured frames. Additionally, the processor 113 controls data accessing of the storage apparatus 115 and operation of the light source controlling unit 117 as well.

However, in the above-mentioned structure, the light is emitted in a bottom to up direction, thus a larger apparatus thickness is needed. Also, under such structure, the light from the light source may needs reflection or refraction for more than one time, thus a complicated light path is needed. Also, the image signal generated from the finger may decade after reflection or refraction for more than one time, thus an unclear image may be generated.

SUMMARY OF THE INVENTION

Therefore, one objective of the present invention is to provide an optical detecting apparatus utilizes a side light source to illuminate the object.

Another objective of the present invention is to provide an optical detecting apparatus that can utilize another light source besides the side light source to illuminate the object.

One embodiment of the present invention discloses an optical detecting apparatus, which comprises: a detecting surface; a first light source, for providing light parallel to the detecting surface; an image sensor, for detecting an object close to the detecting surface, to generate object image data; and an object location determining apparatus, for computing location information of the object according to the object image.

The above-mentioned embodiment can further comprise: a second light source, for generating a light beam emitted to the detecting surface, wherein an angle between the light beam and a normal of the detecting surface is smaller than 60 degree; and a light guide, comprising at least one light transparent region, wherein light from the second light source can pass through the light transparent region to illuminate the object.

Another embodiment of the present invention discloses an optical detecting apparatus, which comprises: a case, having a size that an user can carries it by one hand; a detecting surface, on the case; a first light source, at a side of the detecting surface; an image sensor, for detecting an object close to the detecting surface, to generate object image data of the object; and an object location determining apparatus, for computing location information of the object according to the object image.

The above-mentioned embodiment can further comprise: a second light source, inside the case, wherein the object and the second light source are disposed at different sides of the detecting surface; and a light guide, comprising at least one light transparent region, wherein light from the second light source can pass through the light transparent region to illuminate the object; wherein an angle between the light beam and a normal of the detecting surface is smaller than 60 degree.

In view of above-mentioned embodiments, a side light source can be utilized to illuminate the object to decrease device height and to provide a clear object image. Further, a light guide and another light source can be selectively utilized to provide illumination such that the object image can be more clear.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

FIG. 2 to FIG. 5 are schematic diagrams illustrating optical detecting apparatuses according to embodiments of the present invention. Please note FIG. 2 to FIG. 5 only illustrate part of the structures of the optical detecting apparatus. Persons skilled in the art can easily understand how the structures shown in FIG. 2 to FIG. 5 operate and how the structures cooperate with prior art devices, according to the concept and description of FIG. 2 to FIG. 5. For example, the embodiments shown in FIG. 2 to FIG. 5 can co-operate with the circuits shown in FIG. 1(b), but is not limited. Additionally, the structures shown in FIG. 2 to FIG. 5 are only for example, and do not limit the scope of the present invention to the embodiments shown in FIG. 2 to FIG. 5.

As shown in FIG. 2(a), the optical detecting apparatus 200 includes a detecting surface 201, a case 202, a light source 203, a lens device 205 and an image sensor 207. In this embodiment, the detecting surface 201 is a curved surface. The light source 203 is inside the case 202, to provide side light to the finger 204. The light source 203 can be regarded as providing light parallel to the detecting surface 201 to the finger 204. In one embodiment, the light source 203 is a line light source, which has illuminating area with an illuminating angle. As shown in FIG. 2(b), if it looks to the light source 203 in the X direction, it has a 90 degree illuminating angle. Also, the Y direction has a 10 degree illuminating angle. Additionally, the optical detecting apparatus can further include a pillar lens 209 such that the light from the light source 203 can be more concentrated.

Figure 3:
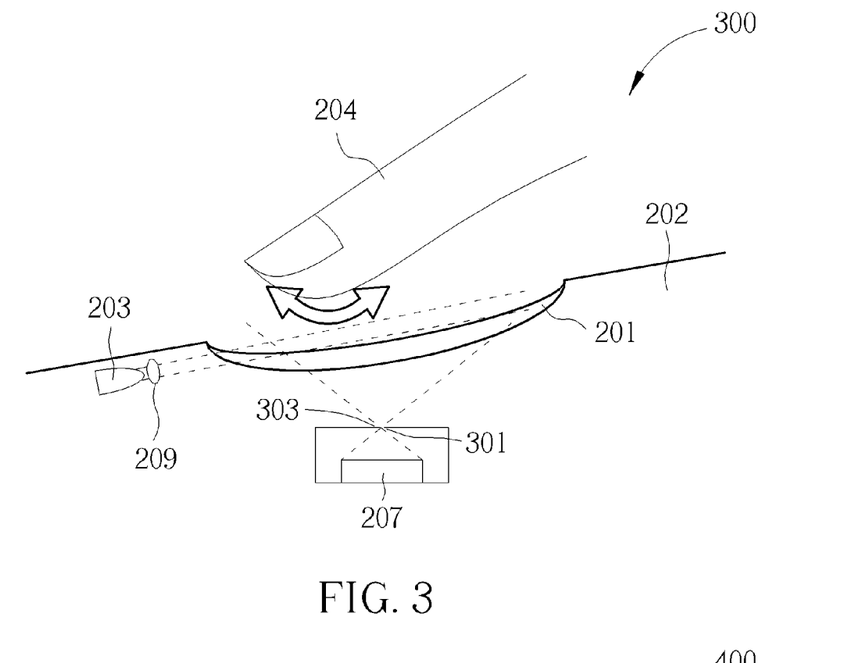

The image sensor 207 captures image according to reflection light from the finger 204 via the lens device 205, and computes location information of the finger 204 via the processor (for example, 113 in FIG. 1(b)). Such location information can include the location when the finger stops, or a moving trace while the finger is moving. The processor can generate a control signal according to the location information to control a corresponding target (ex. a cursor) or a corresponding operation (ex. scrolling or panning) on a display. The lens device 205 can be a wide range lens or a fish eye lens, depending on different design requirements. The lens device 205 can be replaced by a pinhole apparatus 301, as shown in FIG. 3. In FIG. 3, the image sensor 207 is included in the pinhole apparatus 301, and receives reflection light from the finger 204 via a pinhole 303.

It should be noted that the purpose that the image sensor captures the image it to acquire object image data such that location information can be computed. The object image data can comprise many kinds of data, such as original data of a whole image, object data, or object barycentre data, which are all related with the location of the object. The determining mechanism can be set to the image sensor, to the processor, or to a master system coupled to the processor, while designing the hardware. That is, the image sensor, the processor, or a master system connected to the processor can all be utilized as an object location determining apparatus. The object barycentre data means the barycentre data that is acquired by computing the object data from the image sensor, such that the object barycentre data can indicate the whole object.

Figure 2:
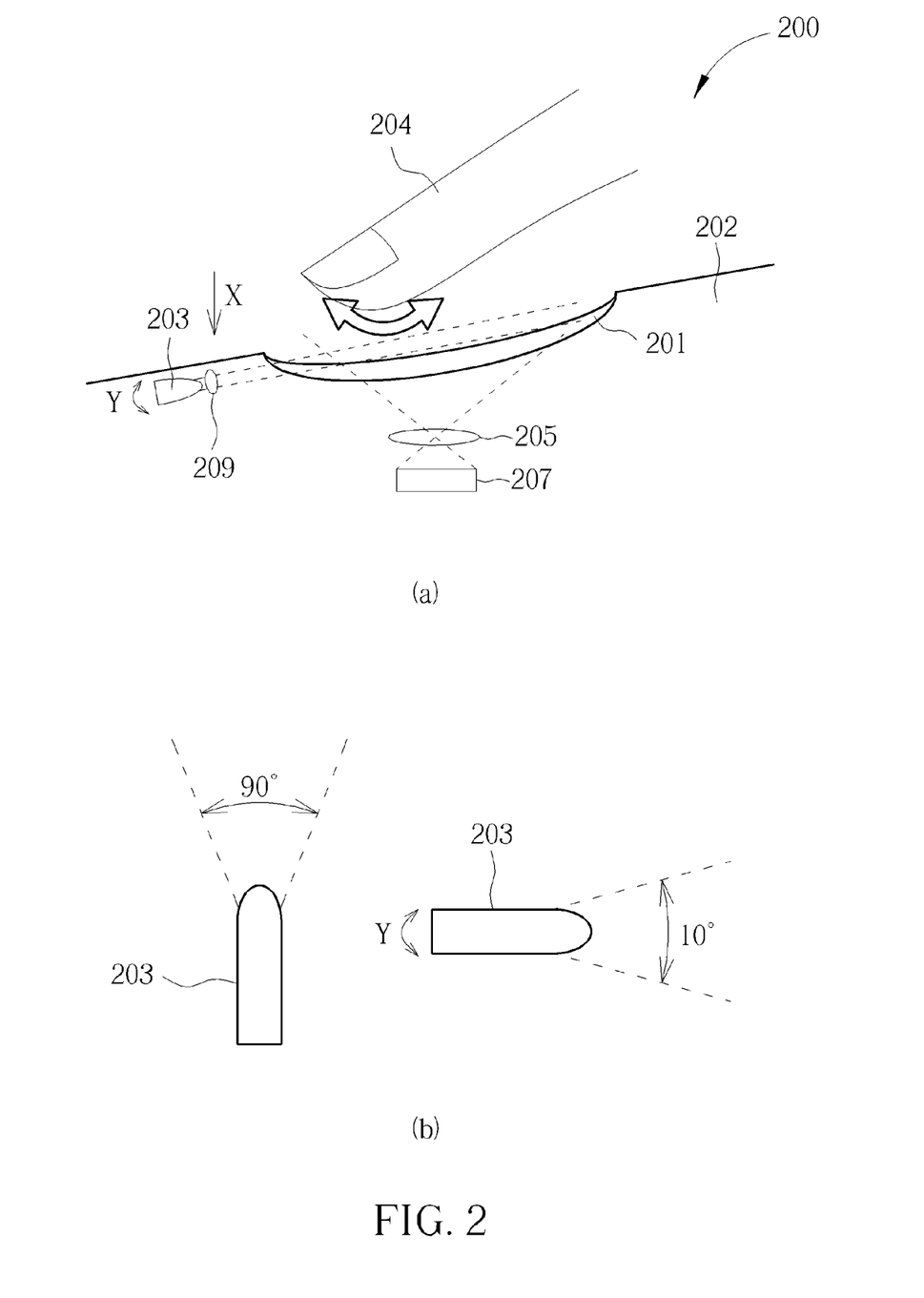
FIG. 2 to FIG. 5 are schematic diagrams illustrating optical detecting apparatuses according to embodiments of the present invention.
Figure 4:
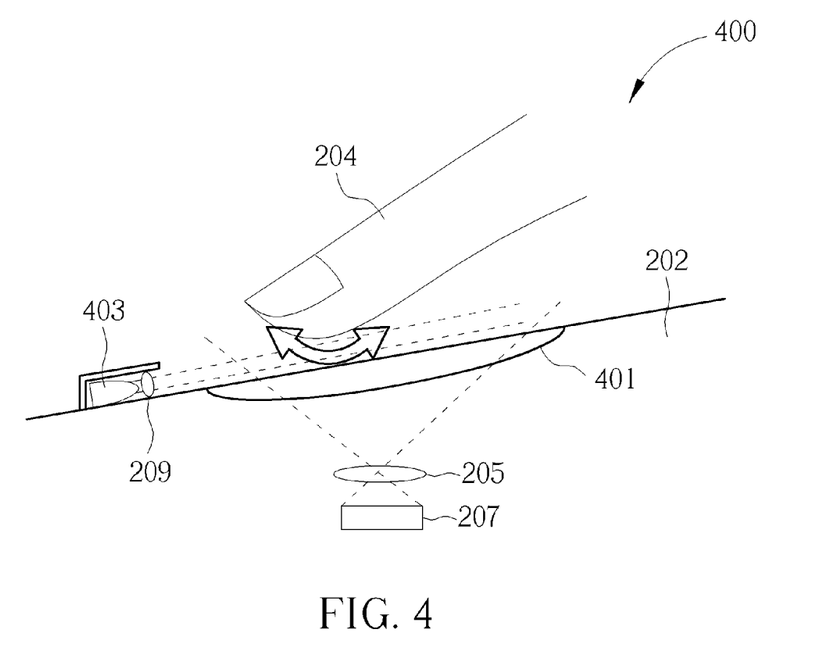
Figure 5:
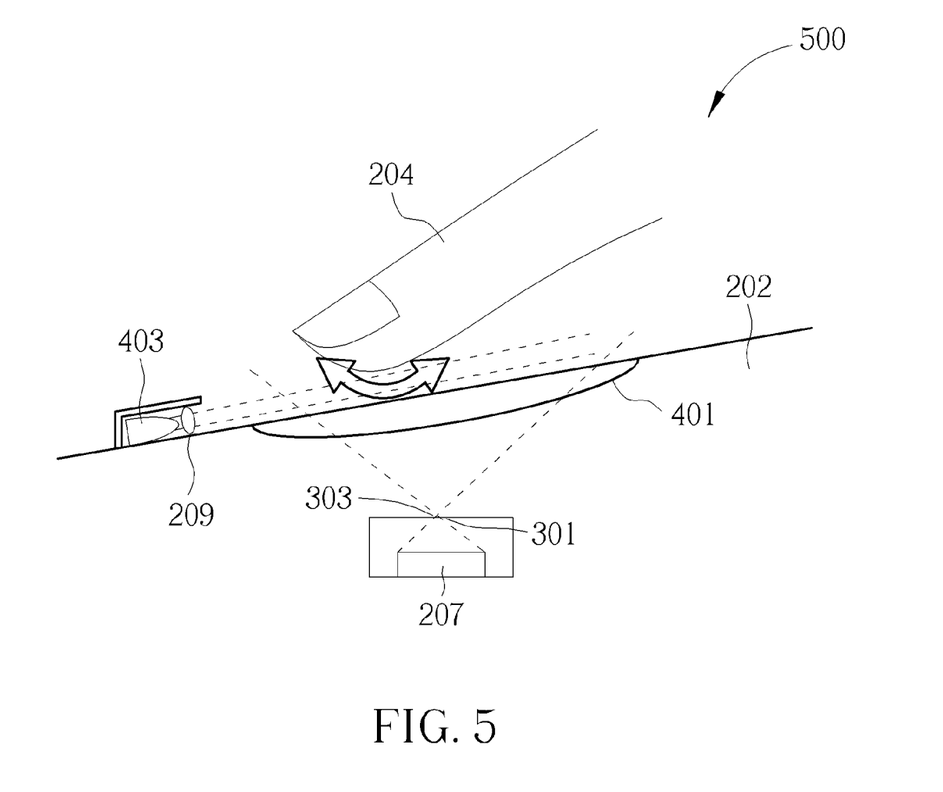

FIG. 4 illustrates an optical detecting apparatus 400 according to another embodiment of the present invention. One difference between the optical detecting apparatus 400 and the optical detecting apparatus 200 in FIG. 2 is that the detecting surface 401 of the optical detecting apparatus 400 is a planar surface but the detecting surface 201 of the optical detecting apparatus 200 is a curved surface. Another difference is, the light source 403 of the optical detecting apparatus 400 is outside the case 202, but the light source 203 of the optical detecting apparatus 200 is inside the case 202. Other detail structures of the optical detecting apparatus 400 has already been depicted in FIG. 2, thus it is omitted for brevity here. Additionally, the lens device 205 of the optical detecting apparatus 400 can be replaced with the pinhole apparatus 301, as shown in FIG. 5.

As above-mentioned description, the processor computes location information of the finger or the object according to the image data after capturing the image data of the finger. One computing method is, utilizing a light source controlling unit (ex. 107 in FIG. 1) to turn on the light source such that light source turning on object image data is acquired, which includes object image illuminated by environment light and the light from the light source. After that, utilizing the light source controlling unit to turn off the light source such that light source turning off object image data is acquired, which includes object image only illuminated by environment light. Then one of the light source turning on object image data and the light source turning off object image data is subtracted from the other to acquire a differential object image data indicating object image only illuminated by light from the light source, which is more accurate. Next the processor is utilized to compute the location information according to the differential object image data.

Figure 6:
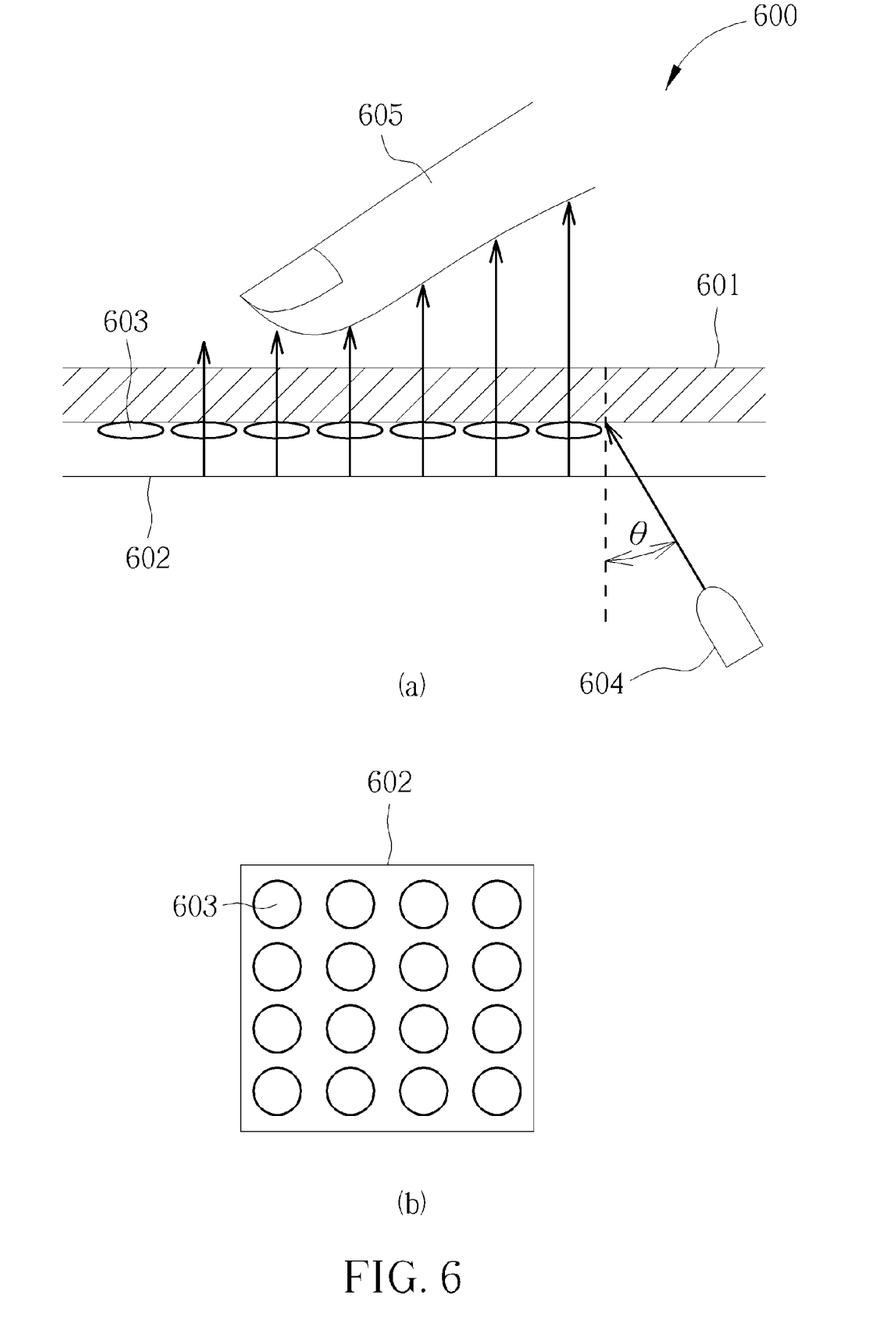
FIG. 6 is a schematic diagram illustrating an optical detecting apparatus according to one embodiment of the present invention, which includes another light source besides the flank light source illustrated in FIG. 2 to FIG. 5.

Besides, the above-mentioned side light source, the optical detecting apparatus according to the present invention can further include a non side light source to help illuminate, such that object image can be more clear. FIG. 6 illustrates an optical detecting apparatus 600 according to the embodiment of the present invention, which includes another light source besides the side light source shown in FIG. 2 to FIG. 5. As shown in FIG. 6(a), the optical detecting apparatus 600 includes a detecting surface 601, a light guide 602 and a light source 604. The light guide 602 comprises at least one light transparent region. Light from the light source 604 can pass through the light transparent region to illuminate the finger 605. Such light transparent region can be generated via providing light transforming material 603 to the light guide 602. For a conventional light guide, light will fully reflect inside the light guide after emits into it. However, the full reflection is destroyed after providing the light transforming material 603 to the light guide 602, such that the light can emit out the light guide 602. In one embodiment, an angle between the light beam from the light source 604 and a normal of the detecting surface 601 is smaller than 60 degree. FIG. 6(b) is a top view illustrating that the light transforming material 603 is provided to the light guide 602. The structures shown in FIG. 6(a) and FIG. 6(b) can be independently applied to an optical detecting apparatus, and can be combined to the embodiments shown in FIG. 2 to FIG. 5 as well. Additionally, the structures shown in FIG. 6(a) and FIG. 6(b) can be combined to the circuit block diagrams in FIG. 1(b).

Figure 7:
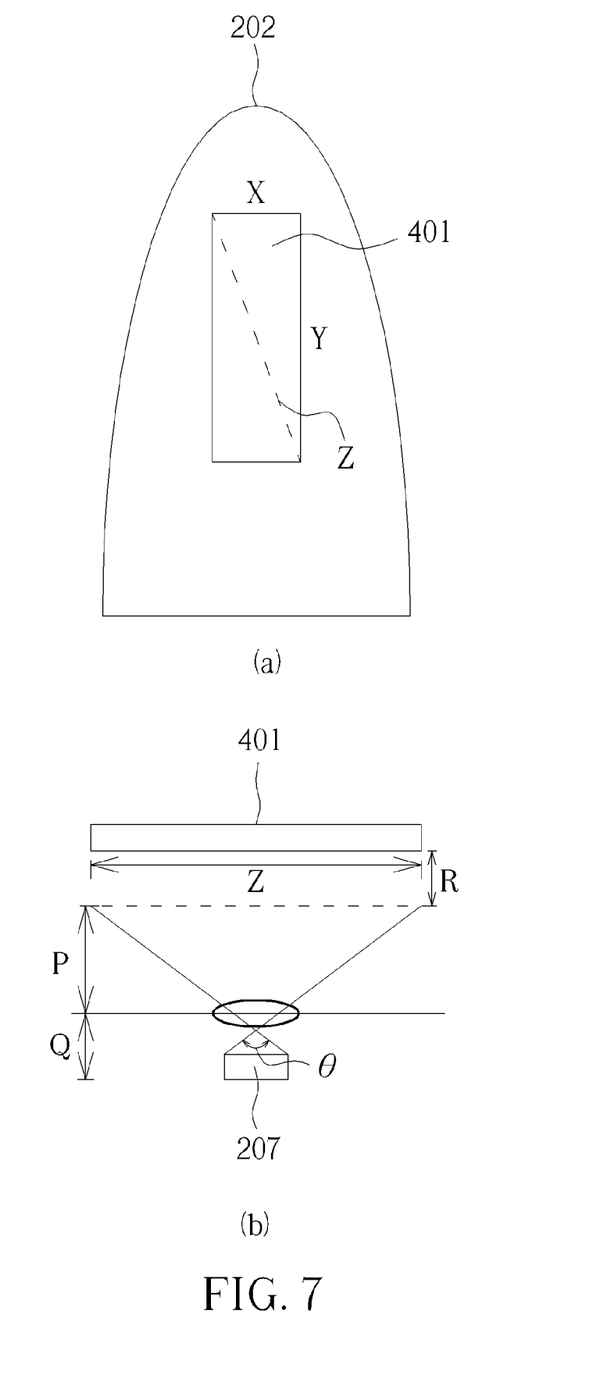
FIG. 7 is a schematic diagram illustrating the sizes for the components of the optical detecting apparatus according to embodiments of the present invention.

FIG. 7 is a schematic diagram illustrating the sizes for the components of the optical detecting apparatus according to embodiments of the present invention. In FIG. 7, the structure of FIG. 4 is taken for example. As shown in FIG. 7(a), the detecting surface 401 is a rectangle with a width X and a length Y, such that the diagonal line thereof has a length Z equals to $\sqrt{X^2+Y^2}$. In this embodiment, X is three times as great a Y, but is not limited. FIG. 7(b) illustrates the relations between the detecting surface 401, the lens device 205 and the image sensor 207. In this embodiment, the maximum detecting range of the image sensor 207 is designed to be capable of detecting the diagonal line length Z. The values of P, Q, R are related with the lens focal length, the lens location, the value of Z, and the heights for necessary devices. Persons skilled in the art can understand how to compute necessary parameters according to the teaching of the present application, thus it is omitted for brevity here.

In view of above-mentioned embodiments, the present invention can be utilized as an optical wheel to replace a conventional wheel in a mouse. That is, the abovementioned detecting surface, the first source, the image sensor and the object location determining apparatus form an optical wheel. If the present invention is utilizes as an optical wheel, the present invention can further detect pressing and a gesture besides the conventional forward whirling and back whirling operation, such that an user can trigger more commands.

It should be noted that although above-mentioned embodiment utilizes an optical touch controlling apparatus to explain, the contents of the present invention can be applied to an optical navigating apparatus such as an optical mouse.

In view of above-mentioned embodiments, a side light source can be utilized to illuminate the object to decrease device height and to provide a clear object image. Further, a light guide and another light source can be selectively utilized to provide illumination such that the object image can be more clear.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting apparatus, comprising:
   a detecting surface formed on a surface of an optical wheel;
   a first light source, for providing light parallel to the detecting surface;
   an image sensor located within the optical wheel, for detecting an object close to the detecting surface, to generate object image data; and
   an object location determining apparatus located within the optical wheel, for computing location information of the object according to the object image.

2. The optical detecting apparatus of claim 1, wherein the first light source is a line light source.

3. The optical detecting apparatus of claim 1, further comprising:
   a lens device, which is a wide range lens or a fish eye lens, to receive reflection light of the object;
   wherein the image sensor generates the object image data according to the reflection light of the object.

4. The optical detecting apparatus of claim 1, further comprising:
   a pinhole apparatus, for receiving reflection light from the object;
   wherein the image sensor receives the reflection light via a pinhole of the pinhole apparatus to generate the object image data.

5. The optical detecting apparatus of claim 1, further comprising:
   a light source controlling unit, for turning on or turning off the first light source;
   wherein the image sensor generates light source turning on object image data when the first light source is turned on and generates light source turning off object image data when the first light source is turned off;
   wherein the object location determining apparatus subtracts one of the light source turning on object image data and the light source turning off object image data from the other to acquire a differential object image data, and computes the location information of the object according to the differential object image data.

6. The optical detecting apparatus of claim 1, wherein the object location determining apparatus generates a control signal according to the location information to control a corresponding target or a corresponding operation on a display.

7. The optical detecting apparatus of claim 1, wherein the image sensor is utilized to generate object image data of an object moving on the detecting surface, where the object location determining apparatus further computes a moving trace of the object according to the object image data, as the location information.

8. The optical detecting apparatus of claim 1, further comprising:
   a second light source, for generating a light beam emitted to the detecting surface, wherein an angle between the light beam and a normal of the detecting surface is smaller than 60 degree; and
   a light guide, comprising at least one light transparent region, wherein light from the second light source can pass through the light transparent region to illuminate the object.

9. The optical detecting apparatus of claim 1, wherein the detecting surface is a rectangle having a longer side and a shorter side, where the longer side has a length that is N times as great as the length of the shorter side.

10. The optical detecting apparatus of claim 1, wherein the detecting surface is a rectangle, and a maximum detecting range for the image sensor is a length for a diagonal line of the detecting surface.

11. The optical detecting apparatus of claim 1, wherein the object image data comprises at least one kind of following data: original data of a whole image, object data, object barycentre data.

12. The optical detecting apparatus of claim 1, wherein the object location determining apparatus is incorporated into the image sensor.

13. The optical detecting apparatus of claim 1, further comprising a processor, wherein the object location determining apparatus is incorporated into the processor; or, the object location determining apparatus is a master apparatus connected to the processor.

14. The optical detecting apparatus of claim 1, wherein the first light source is disposed inside the optical wheel, the detecting surface is a curved surface, and the object is a user's finger moving along the detecting surface.

15. An optical detecting apparatus, comprising:
   a case of an optical wheel;
   a detecting surface formed on a surface of the case;
   a first light source, at a side of the detecting surface;
   an image sensor located within the case, for detecting an object close to the detecting surface, to generate object image data of the object; and
   an object location determining apparatus located within the case, for computing location information of the object according to the object image.

16. The optical detecting apparatus of claim 15, wherein the first light source is a line light source.

17. The optical detecting apparatus of claim 15, further comprising:
   a lens device, which is a wide range lens or a fish eye lens, to receive reflection light of the object;
   wherein the image sensor generates the object image data according to the reflection light of the object.

18. The optical detecting apparatus of claim 15, further comprising:
   a pinhole apparatus, for receiving reflection light from the object;
   wherein the image sensor receives the reflection light via a pinhole of the pinhole apparatus to generate the object image data.

19. The optical detecting apparatus of claim 15, further comprising:
   a light source controlling unit, for turning on or turning off the first light source;

wherein the image sensor generates light source turning on object image data when the first light source is turned on and generates light source turning off object image data when the first light source is turned off;

wherein the object location determining apparatus subtracts one of the light source turning on object image data and the light source turning off object image data from the other to acquire a differential object image data, and computes the location information of the object according to the differential object image data.

20. The optical detecting apparatus of claim 15, wherein the object location determining apparatus generates a control signal according to the location information to control a corresponding target or a corresponding operation on a display.

21. The optical detecting apparatus of claim 15, wherein the first light source is inside the case, the detecting surface is a curved surface, and the object is a user's finger moving along the detecting surface.

22. The optical detecting apparatus of claim 15, wherein the first light source is inside the case and the detecting surface is a planar surface.

23. The optical detecting apparatus of claim 15, wherein the image sensor is utilized to generate object image data of an object moving on the detecting surface, where the object location determining apparatus further computes a moving trace of the object according to the object image data, as the location information.

24. The optical detecting apparatus of claim 15, further comprising:

a second light source, inside the case, wherein the object and the second light source are disposed at different sides of the detecting surface; and a light guide, comprising at least one light transparent region, wherein light from the second light source can pass through the light transparent region to illuminate the object;

wherein an angle between the light beam and a normal of the detecting surface is smaller than 60 degree.

25. The optical detecting apparatus of claim 15, wherein the detecting surface is a rectangle having a longer side and a shorter side, where the longer side has a length that is N times as great as the length of the shorter side.

26. The optical detecting apparatus of claim 15, wherein the detecting surface is a rectangle, and a maximum detecting range for the image sensor is a length for a diagonal line of the detecting surface.

27. The optical detecting apparatus of claim 15, wherein the object image data comprises at least one kind of following data: original data of a whole image, object data, object barycentre data.

28. The optical detecting apparatus of claim 15, wherein the object location determining apparatus is incorporated into the image sensor.

29. The optical detecting apparatus of claim 15, further comprising a processor, wherein the object location determining apparatus is incorporated into the processor; or, the object location determining apparatus is a master apparatus connected to the processor.

* * * * *